Patented Apr. 10, 1934

1,954,715

UNITED STATES PATENT OFFICE 1,954,715

HIGHLY REFRACTORY MASS AND PROCESS OF PRODUCING SAME

Arthur Sprenger, Berlin-Karlshorst, Germany

No Drawing. Application November 12, 1930, Serial No. 495,242. In Germany August 25, 1930

12 Claims. (Cl. 75—22.5)

This invention relates to a highly refractory mass obtained by smelting and containing the oxides of chromium, aluminium and magnesium, said mass being not only equal to the best refractory products hitherto known, but far superior thereto as regards refractoriness, resistance against the action of slags and against high temperatures under pressure. All these favourable important properties are combined in masses according to the invention.

It often presented great difficulties to prepare reliable high-grade refractory building materials from the oxides of the chromium, aluminium and magnesium. It has now been found that these difficulties can be overcome, if to the mass the composition is given according to the formula:

$$z[FeO.Al_2O_3+(2-x)FeO.Cr_2O_3]+ \\ 4[yMgO.Al_2O_3+(2-y)MgOCr_2O_3]$$

in which $z<1$, $y<2$, $x<2$, that is, the composition of the mass from the several oxides, corresponds at least approximately to the entire formula. The oxides required according to the formula, should amount all together to 80% and more of the mass. As remaining foreign components the mass contains chiefly silicic acid, which can be present to about 15%, so that the mass consists therefore almost exclusively of the oxides of the chromium, aluminium, magnesium and silicon which undoubtedly combine independently of the formula and prescriptions for proportions on which the composite of the raw mixture is based. It is advisable within the limits indicated to prepare the mass for high percentage of chromium sesquioxide, if high silicic acid content is present.

For adjusting the mixture or the raw mixture for the smelting process to be carried out, the formation of magnesia and iron compounds is assumed according to the invention, and it has been found, that the FeO-proportion can be comparatively high without prejudice, because by fixing the quantity of certain proportions, for example of the FeO- and of the $Cr_2O_3$ proportions, the quantities of the other components MgO and $Al_1O_3$, are influenced in a quite determined manner.

It is advisable under certain conditions, to apportion the several oxides according to the prescription given in such a manner, that the proportions determining the formula amount together to about 90% of the mass, that is for example to 87 to 93%, whereas besides same MgO, $Al_2O_3$ or $SiO_2$, or two, or all these oxides are present, which can then be regarded as cement or binding medium for the supposed oxide combinations. Any oxides, such as $TiO_2$, CaO and others, which may be present also participate in the cement formation.

As has been stated, the values $x$ and $y$ in the formula may vary. They should however always remain below the numeral value 2, so that in all instances combinations of chromium sesquioxide are also present. The proportional value of the chromium sesquioxide combinations— MgO $Cr_2O_3$ and FeO $Cr_2O_3$—supposed in the apportioning of the mass to the aluminium oxide combinations—MgO $Al_2O_3$ and FeO $Al_2O_3$—, also assumed should not be less than the numerical value 1:8.5. It is therefore advisable, to keep a certain minimum limit for the chromium sesquioxide, as masses rich in chromium sesquioxide behave particularly well. Masses rich in chromium sesquioxide are for example obtained by choosing the value 1 for $x$ and $y$. Particularly advantageous results are obtained, if the mass is made richer in chromium sesquioxide by departing from the value 1 for $x$ and $y$, that is the chromium sesquioxide compounds, intended for the apportioning of the mass, should exceed the alumina compounds.

The silicic acid content may, as already mentioned, rise to about 15%. For the apportioning of the mixture or of the raw mixture to be smelted it must be presumed that the silicic acid combines with any existing excess MgO or $Al_2O_3$ or with both these oxides. Basic materials must be calculated as regards silicic acid at the utmost to such quantities that 8% (silicic acid percentages in the total mass) of the silicic acid exist apportioned with the bases in the monomolecular proportion. If the silicic acid content of the mass is for example 11%, then, according to the new mixing—or apportioning—prescription, no or only partly basic oxides should be intended to be used for balancing the silicic acid according to the mono-molecular proportion. In the case of smaller quantities of silicic acid, for example at 4%, basic oxides may be present in excess of the silicic acid, relative to the monomolecular balancing proportion.

Other materials, which occur as impurities, for example calcium oxide, titanium oxide and the like, need not as a rule be specially considered, they occur sometimes in quantities of about 1%. In the presence of greater quantities, lime up to 5%, lime must be valued as basic oxide for the balancing of the silicic acid and titanium oxide as substitute for the silicic acid. Calcium oxide should preferably not be used in mass proportions of more than 3.5%.

Very favourable results have, for example, been obtained, by taking as a basis the value 0.33 and less for $z$, which gives a FeO content per percent up to about 3%. Higher FeO percentage is only chosen as a rule for special purposes, when the $SiO_2$ content is preferably kept lower, as an iron silicate formation has to be avoided. It is advisable, not to allow the FeO content to exceed 7%.

Masses, produced according to the new prescription, have for example the following composition:

|  | I | II | III | IV | V | VI | VII |
|---|---|---|---|---|---|---|---|
|  | Per cent | Per cent | Per cent | Per cent | Per cent | Per cent | Per cent |
| FeO | 3 | 3 | 3 | 2 | 5 | 5 | 2,3 |
| $Al_2O_3$ | 26,43 | 54,08 | 26,43 | 32 | 31,1 | 30,8 | 25,5 |
| $Cr_2O_3$ | 39,37 | 9,00 | 39,37 | 29,2 | 34,4 | 35 | 40,9 |
| MgO | 19,2 | 21,9 | 24,9 | 22 | 19,6 | 19,9 | 21,8 |
| $SiO_2$ | 11,00 | 11,00 | 5,00 | 14,3 | 9,2 $TiO_2$ | 6 3,2 | 8 |

The mass I is obtained in that the silicic acid was assumed to be absolutely unsaturated, disregarding the CaO and $TiO_2$ impurities present in quantities of much less than 1%, the figure 0.33 being selected for the value $z$ and the intention being further to obtain a slag, rich in chromium sesquioxide.

The product II showed the systematic alteration in the chromium sesquioxide content, as compared with the mass I and the product III showed an alteration in the silicic acid content, even under such conditions, that bases for silicate formation were put in account.

For the product IV higher silicic acid content is chosen and in the formulas partial saturation of the silicic acid is aimed at. More than half the silicic acid is presumed to be unsaturated. This mass is itself proof against silicic acid smeltings and possesses at the same time also sufficient resistance against basic attacks, for example against smeltings rich in alkalies, for example glassy fluxes.

The product V has as compared therewith a lower $SiO_2$-content, so that the resistance against bases is increased and because also in this instance more than half the $SiO_2$-quantity has been ignored for the saturation, this product is also very resistant against strong acid attacks.

The product VI shows a $TiO_2$-content, as partial substitute for $SiO_2$.

In the product VII MgO is put in account in suitable quantity for the saturation of the greater part of the quantity of silicic acid. Such masses, as also masses with excess MgO or $Al_2O_3$ content, are chosen in cases, where a particularly great resistance against basic or alkaline attacks is required.

If the products are to withstand the strongest acid attacks, for example of smelted silicic acid, at the utmost half of the silicic acid is to be saturated by bases when apportioning the smelting admixture, irrespective of what quantity of silicic acid is used, whereat, besides the basic material such as MgO and $Al_2O_3$, impurities of basic nature, which may be present, such as lime, are to be taken into consideration. It is advisable, to work to a certain extent with an excess of acid component silicic acid and also chromium sesquioxide must be regarded as such.

Generally speaking, it may be said that with higher chromium sesquioxide content also higher silicic acid content is permissible. At more than 30% $Cr_2O_3$ silica can be more than 10%. The oxide-combinations assumed for the crude mixture apportioning seem to form really according to the results of experiment conducted up to the present. Probably they are present in the form of mixed crystals, so that it may be assumed, that the products consist of the according oxide combinations as base material and of formed silicates as cementing medium.

As prime materials for the smelting process for producing the highly refractory masses, the oxides of the chromium, aluminium, magnesium and silicon can be directly used, or materials containing these oxides for example minerals or ores, which latter contain mostly too large quantities of iron, which can then be separated out by reducing smelting. It is also possible to employ slags, obtained by electrothermic or aluminothermic processes, for example the slags obtained from an aluminothermic ferrovanadium manufacture may be mentioned, which as a rule consist of alumina and magnesia and contain a few percents of iron oxide, silicic acid and lime, in some instances also chromium sesquioxide. Such a slag can be smelted, when the oxides are apportioned according to the prescription given, for example with the addition of chromite, and if necessary alumina and magnesia, a reducing smelting being preferably carried out. As a rule the use of an electric furnace is necessary for carrying out the smelting process. The smelting should preferably be conducted through at high temperatures. For removing too large quantities of iron the electrode carbon alone is sufficient under certain circumstances.

In the case of reducing smelting a loss in chromium sesquioxide can occur at times through reduction to metallic chromium. In this instance any loss in chromium sesquioxide must be considered when preparing the crude mixture.

The slags serving as prime materials may be used in cold condition or in molten condition. If the process, in which the slags are obtained, allows, the apportioning according to the above mentioned directions can be effected by suitable admixtures already during the primary smelting operation, which supplies the slag. The variations from the given mixing—or preparation—rules do not amount to more than, for example, 5 to 10%.

Excess of chromium sesquioxide has proved to be advantageous; consequently, in conjunction with the preparation of the crude mixture according to the invention, additional chromium sesquioxide may be employed, as may be required and considered necessary, because it participates also in the saturation of the silicic acid in the so-called cement and has a strong beneficial effect as regards the quality of the cement and therefore of the product. In this instance the remaining components may amount to about 25% of the mass. Such a mass shows, for example, according to percentages by weight, the following composition:—

$SiO_2 = 6,00\%$
$TiO_2 = 1,60\%$
$CaO = 1,12\%$
$MgO = 19,10\%$
$FeO = 3,00\%$
$Al_2O_3 = 26,46\%$
$Cr_2O_3 = 42,72\%$

In accordance with the invention, the following rules should be considered as regards the apportioning of the chromium oxide content which may be greater than, equal to, or less than the aluminum oxide content, according to the particular type of refractory desired:—

(1) The quantity of oxide compounds containing chromium sesquioxide is less than the quantity of oxide compounds containing alumina.

(2) The quantity of oxide compounds containing chromium sesquioxide is equal to the quantity of oxide compounds containing alumina.

(3) The quantity of oxide compounds containing chromium sesquioxide is greater than the quantity of oxide compounds containing alumina.

(4) The quantity of oxide compounds containing chromium sesquioxide is greater than the quantity of oxide compounds containing alumina, and moreover chromium sesquioxide is further present, which is to be put in account for the saturation of the silicic acid.

(a) In case No. 1 the silicic acid and other impurities are kept as low as possible, if the chromium sesquioxide content is low.

(b) In the cases Nos. 2 to 4 the silicic acid content and the percentage of impurities may be employed increasing.

(c) The highly refractory products according to item 1 show high resistance against the attacks of basic slags.

(d) The resistance of the highly refractory products against the attacks of acid slags increases in the sense of the remarks contained in items 2 to 4.

According to observations, silicates appear to form in the masses, in which silicates the basic percentages and silicic acid are present in the molecular proportion of 1:1. The products made according to the invention are practically free from tensions, comparatively dense, that is without hollow spaces, easy to work, and for example can be hewn.

I claim:

1. A process for the production of highly refractory masses which comprises smelting raw materials containing the oxides of chromium, aluminum, and magnesium in such a manner that the resulting product is composed of at least 80% of chromium oxide, aluminum oxide, magnesium oxide and iron oxide in the proportion of the formulas of their spinel formations $MgO\ Cr_2O_3$, $FeO\ Cr_2O_3$, $MgO\ Al_2O_3$ and $FeO\ Al_2O_3$ and in which there are, of the basic oxides, at least 4 moles of MgO to 1 mole of FeO and of the acid oxides, not over 8,5 moles of $Al_2O_3$ to 1 mole of $Cr_2O_3$, the remainder of the product containing a maximum of 15% silicic acid counted on the basis of the total mass.

2. A process as defined by claim 1 in which the resulting product in the event of the presence of a high content of silicic acid up to 15%, contains a relatively high chromium oxide content.

3. A process as defined by claim 1 in which the resulting product consists of at least 90% of the oxides $Cr_2O_3$, $Al_2O_3$ MgO and FeO in the proportions of the formulas of their spinel formations.

4. A process as defined by claim 1 in which the content of the basic oxides exceeding the amount for forming spinels is at most sufficient for the mono-molecular saturation of one half the silicic acid content.

5. A process as defined by claim 1 in which such quantities of MgO are added for balancing the silicic acid content that the proportion of mono-molecular saturated silicic acid of the total mass does not exceed 8%.

6. A process as defined by claim 1 in which, for the balancing of the silicic acid content, such quantities of $Al_2O_3$ are added, that the proportion of mono-molecular saturated silicic acid of the total mass does not exceed 8%.

7. A process as defined by claim 1 in which, for the balancing of the silicic acid content, such quantities of $Al_2O_3$ and MgO are added, that the proportion of mono-molecular saturated silicic acid of the total mass does not exceed 8%.

8. A process as defined by claim 1, in which the resulting product contains at least 12 moles MgO for each mole FeO.

9. A process for the production of highly refractory masses from slags of electrothermic processes comprising melting a mixture from such slags and raw materials containing the oxides of chromium, aluminum and magnesium in such a manner that the resulting molten product is composed of at least 80% of chromium oxide, aluminum oxide, magnesium oxide and iron oxide in the proportion of the formulas of their spinel formations $MgO\ Cr_2O_3$, $FeO\ Cr_2O_3$, $MgO\ Al_2O_3$ and $FeO\ Al_2O_3$ and in which there are, of the basic oxides, at least 4 moles of MgO to 1 mole of FeO and of the acid oxides, not over 8,5 moles of $Al_2O_3$ to 1 mole of $Cr_2O_3$, the remainder of the product containing a maximum of 15% silicic acid.

10. A process for the production of highly refractory masses from slags of aluminothermic processes comprising melting a mixture from such slags and raw materials containing the oxides of chromium, aluminum and magnesium in such a manner that the resulting molten product is composed of at least 80% of chromium oxide, aluminum oxide, magnesium oxide and iron oxide in the proportion of the formulas of their spinel formations $MgO\ Cr_2O_3$, $FeO\ Cr_2O_3$, $MgO\ Al_2O_3$ and $FeO\ Al_2O_3$ and in which there are, of the basic oxides, at least 4 moles of MgO to 1 mole of FeO and of the acid oxides, not over 8,5 moles of $Al_2O_3$ to 1 mole of $Cr_2O_3$, the remainder of the product containing a maximum of 15% silicic acid.

11. A process for the production of highly refractory masses from slags of electrothermic and aluminothermic processes comprising melting a mixture from such slags and raw materials containing the oxides of chromium, aluminum and magnesium in such a manner that the resulting molten product is composed of at least 80% of chromium oxide, aluminum oxide, magnesium oxide and iron oxide in the proportion of the formulas of their spinel formations $MgO\ Cr_2O_3$, $FeO\ Cr_2O_3$, $MgO\ Al_2O_3$ and $FeO\ Al_2O_3$ and in which there are, of the basic oxides, at least 4 moles of MgO to 1 mole of FeO and of the acid oxides, not over 8,5 moles of $Al_2O_3$ to 1 mole of $Cr_2O_3$, the remainder of the product containing a maximum of 15% silicic acid.

12. A process for the production of highly refractory masses which comprises, smelting raw materials containing the oxides of chromium, aluminum, and magnesium in such a manner that the resulting product is composed of at least 80% of the oxides of chromium, aluminum, magnesium and iron in the proportions of the formulas of the spinel formations, $MgO\ Cr_2O_3$, $FeO\ Cr_2O_3$, $MgO\ Al_2O_3$ and $FeO\ Al_2O_3$ and in which the FeO varies between 2.3% and 5%,
the $Al_2O_3$ varies between 25.5% and 54.08%,
the $Cr_2O_3$ varies between 9% and 42.7%,
the Mg4 varies between 19.2% and 24.9%,
and the $SiO_2$ varies between 5% and 14.3%, and in which there are present at least 4 moles of MgO to 1 mole of FeO, and in which there are present not over 8.5 moles of $Al_2O_3$ to each mole of $Cr_2O_3$.

ARTHUR SPRENGER.